(12) United States Patent
Astrom et al.

(10) Patent No.: US 10,592,771 B2
(45) Date of Patent: Mar. 17, 2020

(54) MULTI-CAMERA OBJECT TRACKING (71) Applicant: Accenture Global Solutions Limited, Dublin (IE)

(72) Inventors: Anders Astrom, Singapore (SG); Vitalie Schiopu, Bertrange (LU); Philippe Daniel, Singapore (SG)

(73) Assignee: Accenture Global Solutions Limited, Dublin (IE)

( * ) Notice: Subject to any disclaimer, the term of this patent is extended or adjusted under 35 U.S.C. 154(b) by 478 days.

(21) Appl. No.: 15/396,026

(22) Filed: Dec. 30, 2016

(65) Prior Publication Data
US 2018/0189600 A1 Jul. 5, 2018

(51) Int. Cl.
*G06K 9/62* (2006.01)
*G06K 9/46* (2006.01)
*G06K 9/00* (2006.01)
*G06T 7/292* (2017.01)
*H04N 5/232* (2006.01)

(52) U.S. Cl.
CPC ........ *G06K 9/6202* (2013.01); *G06K 9/00711* (2013.01); *G06K 9/00771* (2013.01); *G06K 9/4604* (2013.01); *G06K 9/6215* (2013.01); *G06T 7/292* (2017.01); *H04N 5/23216* (2013.01); *G06T 2207/10016* (2013.01); *G06T 2207/30232* (2013.01)

(58) Field of Classification Search
None
See application file for complete search history.

(56) References Cited

U.S. PATENT DOCUMENTS

2010/0157064 A1* 6/2010 Cheng ................ G06K 9/00771
348/169
2014/0347475 A1 11/2014 Divakaran et al.
2016/0092739 A1 3/2016 Oami et al.

FOREIGN PATENT DOCUMENTS

WO WO 2008/100359 8/2008

OTHER PUBLICATIONS

European Extended Search Report in European Application No. 17197413, dated Apr. 28, 2018, 7 pages.
EP Office Action in European Application No. 17197413.2, dated Oct. 1, 2019, 5 pages.

* cited by examiner

*Primary Examiner* — Delomia L Gilliard
(74) *Attorney, Agent, or Firm* — Fish & Richardson P.C.

(57) ABSTRACT

This document describes systems, methods, devices, and other techniques for accessing a first video showing a first two-dimensional scene of an environment and captured by a first camera located in the environment having a first field of view; detecting one or more objects shown in the first video; analyzing the first video to determine one or more features of each of the detected objects shown in the first video; accessing a second video showing a second 2D scene of the environment and captured by a second camera located in the environment having a second field of view; detecting one or more objects shown in the second video; analyzing the second video to determine one or more features of each of the detected objects shown in the second video; and correlating one or more objects shown in the first video with one or more objects shown in the second video.

21 Claims, 6 Drawing Sheets

FIG. 1

| Camera 1 | | | | |
|---|---|---|---|---|
| Object | Features | | | |
| | Colour | Height | Speed | Location |
| P1 | {191, 192, 195} | 170cm | 4 km/h | 80.723909, -76.561125 |
| P2 | {192, 193, 194} | 179cm | 3 km/h | 80.723908, -76.561124 |

| Camera 2 | | | | |
|---|---|---|---|---|
| Object | Features | | | |
| | Colour | Height | Speed | Location |
| P3 | {191, 193, 194} | 178cm | 3km/h | 80.723911, -76.561123 |

MULTI-CAMERA OBJECT TRACKING

TECHNICAL FIELD

This specification generally relates to methods, systems, devices, and other techniques for video monitoring, and more particularly, for example, to techniques for tracking objects across video scenes captured by cameras having different fields of view.

BACKGROUND

Video monitoring systems, e.g., a closed-circuit television system, can provide one or more video cameras to monitor at least one location in view of the cameras. Some video monitoring systems are configured to transmit video signals from the one or more cameras to a central location for presentation on a limited set of monitors, and in certain instances, for recording and additional analysis. For example, a video monitoring system may be adapted to capture and analyze video from various locations including banks, casinos, airports, military installations, convenience stores, parking lots, or the like. Video information from video cameras of video monitoring systems may be sent to and analyzed by a video analytics platform.

SUMMARY

This document generally describes systems, methods, devices, and other techniques for correlating objects shown in one or more videos captured by one or more cameras. A video monitoring system may include one or more computers that receive video content captured by one or more video cameras. The system may analyze the video content and perform various analytics processes to detect certain objects and other features of interest. For example, the system may apply analytics processes to recognize objects, track objects across multiple cameras, identify vehicle license plates, count people or objects in a crowd, perform facial recognition, monitor pedestrian or vehicle traffic conditions, detect objects left at a scene, perform post-event analysis, generate safety alerts, identify suspicious behavior, or perform a combination of multiple of these.

Some video analytics processes receive as input video content from one or more cameras with overlapping fields of view. For example, an airport terminal monitoring system may include a first video camera that monitors a front area of the terminal, e.g., an entrance to the terminal, and a second video camera that monitors an adjacent car park or drop off zone belonging to the terminal. The airport terminal monitoring system may be required to track people or objects as they leave the car park or drop off zone and enter the terminal.

Innovative aspects of the subject matter described in this specification may be embodied in methods that include the actions of accessing, by a computing system, a first video that shows a first two-dimensional (2D) scene of an environment, the first video captured by a first camera located in the environment having a first field of view; detecting, by the computing system, one or more objects shown in the first video; analyzing, by the computing system, the first video to determine one or more features of each of the detected objects shown in the first video; accessing, by the computing system, a second video that shows a second 2D scene of the environment, the second video captured by a second camera located in the environment having a second field of view; detecting, by the computing system, one or more objects shown in the second video; analyzing, by the computing system, the second video to determine one or more features of each of the detected objects shown in the second video; based on (i) the determined one or more features of each of the detected objects shown in the first video, and (ii) the determined one or more features of each of the detected objects shown in the second video, correlating, by the computing system, one or more objects shown in the first video with one or more objects shown in the second video.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

The foregoing and other embodiments can each optionally include one or more of the following features, alone or in combination. In some implementations features of an object comprise one or more of (i) object geolocation, (ii) object speed, (iii) object heading, (iv) object colour profile, (v) object dimensions.

In some implementations at least a portion of the first 2D scene overlaps with a portion of the second 2D scene.

In some implementations correlating one or more objects shown in the first video with one or more objects shown in the second video comprises determining that one or more objects shown in the first video are the same as one or more objects shown in the second video.

In some implementations determining whether one or more objects shown in the first video are the same as one or more objects shown in the second video comprises, for each object shown in the first video, comparing the determined one or more features of the object with the determined one or more features of each of the one or more objects shown in the second video.

In some implementations comparing the determined one or more features of the object with the determined one or more features of each of the one or more objects shown in the second video comprises: representing (i) the object shown in the first video, and (ii) each of the one or more objects shown in the second video, as respective feature vectors; and performing a similarity comparison of the feature vector representing the object shown in the first video and each feature vector representing the one or more objects shown in the second video.

In some implementations comparing the determined one or more features of the object with the determined one or more features of each of the one or more objects shown in the second video comprises: for each determined feature of the object shown in the first video, determining respective similarity scores between the feature of the object shown in the first video and the features of the one or more objects shown in the second video; for each object shown in the second video, combining the determined similarity scores to generate an overall similarity score; for each object shown in the second video, comparing the generated overall similarity score to a predetermined threshold similarity score to determine whether the object shown in the second video is the same as the object shown in the first video.

In some implementations determining that one or more objects shown in the first video are the same as one or more objects shown in the second video comprises applying one or more real-world constraints to the one or more objects shown in the first video and the one or more objects shown in the second video.

In some implementations the first 2D scene and second 2D scene are disjoint 2D scenes.

In some implementations correlating one or more objects shown in the first video with one or more objects shown in the second video comprises predicting that an object shown in the first video is moving into the second 2D scene.

In some implementations predicting that an object shown in the first video is moving into the second 2D scene comprises applying one or more real-world constraints to the object shown in the first video.

In some implementations the method further comprises tracking an object shown in the first video across the first field of view and the second field of view.

In some implementations the method further comprises marking the tracked object.

In some implementations the method further comprises disabling a camera when the tracked object leaves a respective field of view.

In some implementations the method further comprises storing data representing the correlated one or more objects shown in the first video with one or more objects shown in the second video.

Some implementations of the subject matter described herein may realize, in certain instances, one or more of the following advantages.

A system for correlating multiple objects shown in multiple videos, as described in this specification, enables video monitoring systems to correlate objects shown in multiple videos captured by multiple video cameras. Correlated objects may be marked and tracked as they move through different video camera fields of view. By correlating, marking and tracking objects, a video monitoring system associated with the system for correlating multiple objects shown in multiple videos may more efficiently monitor an environment in which video cameras are located. For example, persons or objects of interest may be identified and tracked as they move through the environment, enabling security services to take effective action when required and thus improving the security and safety of the environment.

In addition, a system for correlating multiple objects shown in multiple videos, as described in this specification, may achieve higher levels of accuracy than other video monitoring systems that do not correlate multiple objects shown in multiple videos. For example, the system for correlating multiple objects shown in multiple videos may be used to predict when an identified object is leaving a first field of view of a first camera and entering a second field of view of a second camera. By applying real-world constraints to identified objects the system may reduce the number of false predictions, thus improving system accuracy and efficiency.

Furthermore, a system for correlating multiple objects shown in multiple videos, as described in this specification, may be more energy efficient than other video monitoring systems that do not correlate multiple objects shown in multiple videos. For example, the system for correlating multiple objects shown in multiple videos may track an identified object through multiple fields of views of multiple respective cameras. Upon determining that the tracked object has left a particular field of view, the system may disable the video camera with the particular field of view, thus saving energy and computational resources. Moreover, the amount of storage space required to save recorded video may be reduced by selectively activating and deactivating video cameras (and recording of the cameras' video feeds) based on whether a tracked object is determined or predicted to be present within the respective fields of view of the cameras at particular times. Thus, if an operator of a video analytics platform is only interested in recording video that tracks movement of a particular person within a store, the operator may use an input device of the analytics platform to mark that person as a tracked object, and the system may selectively record video feeds from different cameras within the store based on whether the tracked person is determined or predicted to be shown within the field of view of a given video camera.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

FIG. 2A shows objects in the environment at a first instance in time, and FIG. 2B shows objects in the environment at a second instance in time, with each image showing a same object in different locations.

Like reference symbols in the various drawings indicate like elements.

DETAILED DESCRIPTION

This specification generally describes systems, methods, devices, and other techniques for tracking objects across one or more videos of one or more two-dimensional (2D) scenes of an environment. For example, systems and methods consistent with the disclosed embodiments may access a first video that shows a first 2D scene of an environment, where the first video has been captured by a first video camera located in the environment having a first field of view, detect one or more objects that are shown in the first video and analyze one or more features of each of the one or more objects detected in the first video. The disclosed systems and methods may further access a second video that shows a second 2D scene of the environment, where the second video has been captured by a second video camera located in the environment having a second field of view, detect one or more objects that are shown in the second video and analyze one or more features of each of the one or more objects detected in the second video. Based on the determined features, the disclosed systems and methods may correlate one or more objects shown in the first video with one or more objects shown in the second video.

In some aspects, a video analytics platform, a video management system, and one or more video cameras may be interconnected across one or more wired or wireless communications networks. The video cameras may be associated with a video surveillance system, and may include, but are not limited to, cameras with fixed fields-of-view and cameras with variable fields-of-view, such as pan-zoom-tile (PZT) cameras. In certain instances, the one or more video cameras may transmit captured digital video data to the video analytics platform across the communications network. In other instances, and consistent with the disclosed embodiments, the video management system may receive, process, and/or store digital video data received from the one or more video cameras, and the video management system may transmit at least a portion of the received, processed, and/or stored digital video data to the video analytics platform. The video analytics platform may, in certain aspects, apply video analytics and image processing algorithms to frames of the digital video data to track objects across one or more of the video cameras. The video cameras may include overlapping fields of view or may include disjoint fields of view. The objects may include, but are not limited to, a person in a crowded area, a vehicle driving on a highway, animals in a zoo or natural habitat, or any other moving objects.

In additional aspects, the video analytics platform may obtain data from multiple video cameras identifying multiple candidate objects and analyze features of the candidate objects to determine whether they are a same object. For example, some candidate objects may be associated with a statistical model representing features of the respective candidate object. The video analytics platform may obtain data from multiple video cameras identifying multiple candidate objects and analyze features of the candidate objects, e.g., height, colour, speed, location. The video analytics platform may determine a similarity or difference score for each analyzed feature by comparing each analyzed feature to a corresponding statistical model for the candidate object. The determined scores may be used to generate an overall similarity or difference score for each candidate object which may be compared to an adjustable, predetermined threshold to determine whether the candidate objects are the same object.

For example, a video analytics platform consistent with the disclosed embodiments may be maintained by a stadium, and may be configured to receive digital video data from one or more video cameras at one or more locations that monitor a baseball field in the stadium. During a game, using any of the exemplary processes described above, the video analytics platform may detect, within received video data, a ball shown in one or more videos that show respective 2D scenes of the baseball field. The video analytics platform may track the movement of the ball during the game using the one or more cameras. In some aspects the video analytics platform may identify multiple candidate baseballs during a game and analyze features of the candidate objects to determine whether they are the same object. For example, candidate baseballs may include birds flying near the stadium or members of the crowd. By analyzing features of the candidate baseballs, e.g., candidate baseball current speed, the video analytics platform can determine that a bird hovering over the baseball field is not in fact a baseball flying through the air.

Figure 1:
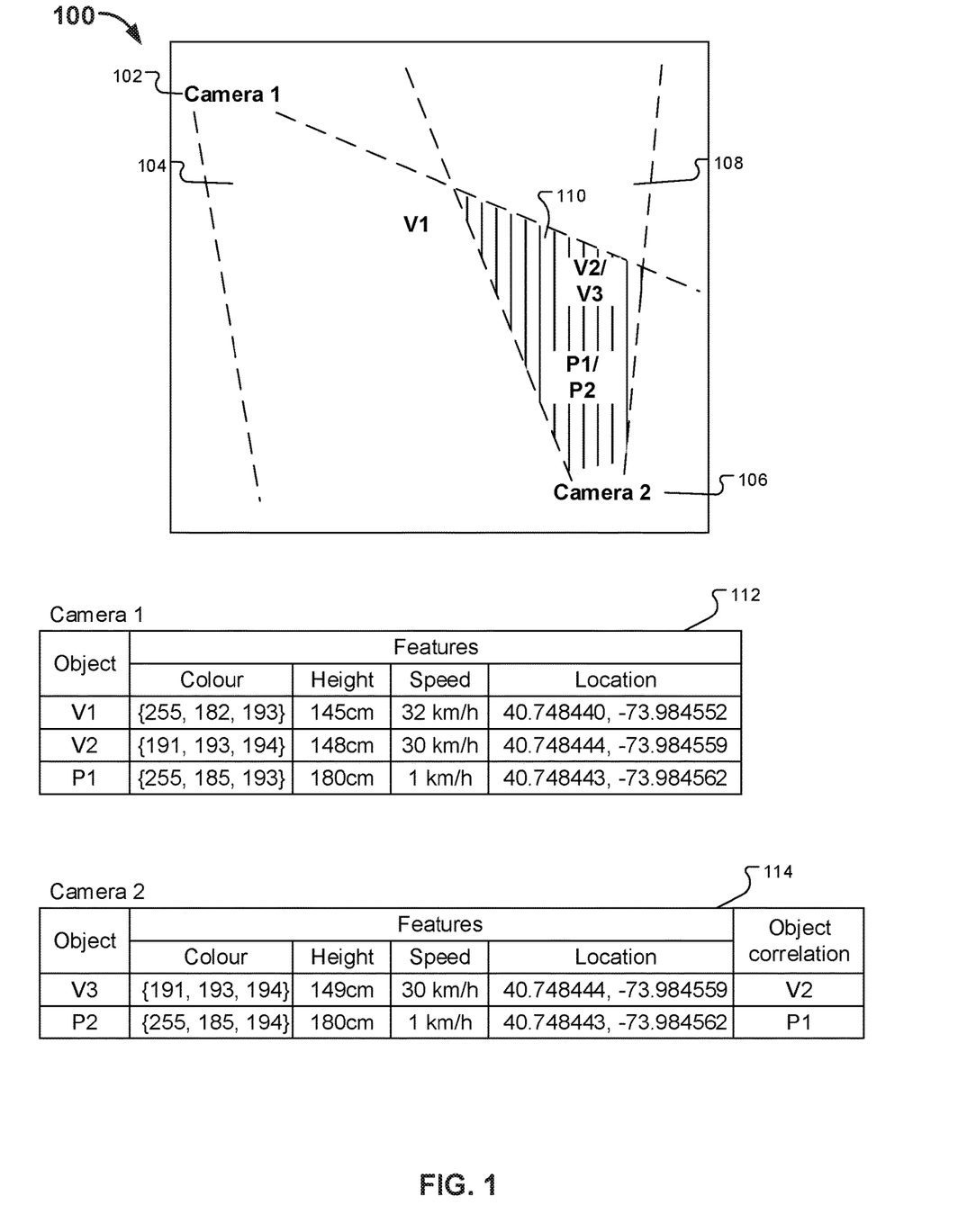
FIG. 1 depicts an example overhead view of multiple overlapping cameras in a real-world environment.

FIG. 1 depicts an example overhead view 100 of multiple overlapping cameras in a real-world environment. The overhead view 100 shows an environment that includes a first camera 102 and a second camera 106. The first camera 102 has a first field of view 104. The second camera 106 has a second field of view 108. A region 110 of the first field of view 104 overlaps with the second field of view 108, i.e., the first camera 102 and second camera 106 have at least partially overlapping fields of view.

The first camera 102 captures a first video that shows a first two-dimensional (2D) scene of the environment. The first video may show one or more objects that appear in the first field of view 104. For example, the environment may include a portion of a city center and the first camera 102 may be located outside a bank or convenience store located in the city center. Continuing the example, the first field of view 104 may include a street and sidewalk. Objects that appear in the first field of view may therefore include vehicles, pedestrians, trashcans, benches, street signs or lampposts. For illustrative purposes, FIG. 1 shows three objects V1, V2 and P1, e.g., two vehicles and a pedestrian, as appearing in the first field of view 104.

The first camera 102 may capture a first video of the first 2D scene of the environment and provide the captured video for analysis, e.g., to a video analytics platform as described in more detail below with reference to FIG. 4. The video analytics platform may analyze the captured first video to determine features of the one or more objects that appear in the first field of view 104, e.g., object geolocation, object colour, object dimensions or object speed.

For example, as shown in table 112, the video analytics platform may analyze the captured first video and determine that object V1, e.g., a first vehicle, may predominantly be represented in RGB colours as {255, 182, 193}, has a maximum height of 145 cm, is travelling at a speed of 32 km/h and is located at (40.748446, −73.984569) in GPS coordinates. In addition, the video analytics platform may determine that object V2, e.g., a second vehicle, may predominantly be represented in RGB colours as {191, 193, 194}, has a maximum height of 148 cm, is travelling at a speed of 30 km/h and is located at (40.748444, −73.984559) in GPS coordinates. Furthermore, the video analytics platform may determine that object P1 may predominantly be represented in RGB colours as {255, 185, 193}, has a maximum height of 180 cm, is travelling at a speed of 1 km/h and is located at (40.748439, −73.984561) in GPS coordinates.

In some examples, the video analytics platform may analyze the captured video and determine that an object may be predominantly represented as a colour that is described in HSL/HSV colour spaces. For example, HSL/HSV colour spaces can provide an intuitive sense of what changing the values will do to the color. The first value is the color itself. Increasing the second value will increase the saturation of that color. Decreasing the third value will decrease the lightness of that color. This may make search and correlation between objects easier than using RGB representations. For example, a HSL profile between dark and light blue may be very similar and easy to compare:
Dark Blue: HSL—{231,49,48}; RGB—{62,71,122}
Light Blue: HSL—{231,49,87}; RGB—{113,129,221}.
In this example it is noticeable that for HSL, only one value changed—the luminosity. For RGB, all the values have changed.

As described above, in some examples the video analytics platform may analyze the captured first video and determine where an object is located in GPS coordinates. For example, GPS coordinates may be a better way to represent an object location in outdoor environments. When comparing determined object locations from different cameras, slight deviations in the location calculations can occur. The objects may then be referred to as being in an immediate proximity defined by a range between, e.g., 0.3 m and 0.5 m, when a satellite positioning of objects is known. This range may be larger if the GPS location of the camera is known, and object locations are estimated relative to this location. For indoor environments, e.g., train stations or airport terminals, a different scale may be used for to determine object locations. In addition, the techniques used to determine the locations may include other technologies such as WiFi or Bluetooth.

In some implementations, conventional object recognition and image or video processing techniques may be employed to determine the features of objects that appear within the field of view of a video. For example, the system may use deep learning technologies to classify objects accurately, e.g., deep neural networks that have been trained using a corpus of training data to recognize/classify objects. In some cases using deep learning technologies to classify object may include analyzing cropped images of objects to extract specific features of an object such as a hat, backpack, bag. In some implementations, the object features may be determined by object analyzer 450 of FIG. 4.

The second camera 106 captures a second video that shows a second 2D scene of the environment. The second video may show one or more objects that appear in the second field of view 104. For example, continuing the example above, the environment may include a portion of a city center and the second camera 106 may be located outside a different bank or convenience store located in the city center. The second field of view 108 may therefore also include a street and sidewalk and objects that appear in the second field of view may also include vehicles, pedestrians, trashcans, benches, street signs or lampposts. For illustrative purposes FIG. 1 shows two objects V3 and P2, e.g., a vehicle and a pedestrian, as appearing in the second field of view 108.

The second camera 106 may capture a second video of the second 2D scene of the environment and provide the captured video for analysis, e.g., to a video analytics platform. The video analytics platform may analyze the captured second video to determine features of the one or more objects that appear in the second field of view 108, e.g., object geolocation, object colour, object dimensions or object speed.

For example, as shown in table 114, the video analytics platform may analyze the captured first video and determine that object V3, e.g., a vehicle, may predominantly be represented in RGB colours as {191, 193, 194}, has a maximum height of 149 cm, is travelling at a speed of 31 km/h and is located at (40.748445, −73.984560) in GPS coordinates. Furthermore, the video analytics platform may determine that object P2 may predominantly be represented in RGB colours as {255, 185, 194}, has a maximum height of 180 cm, is travelling at a speed of 1 km/h and is located at (40.748440, −73.984562) in GPS coordinates. As described above when describing the use of GPS coordinates and as illustrated in FIG. 1, the video analytics platform may determine different speeds of a same object based on different videos captured by different cameras, that is a speed of an object that has been determined using a first camera may not exactly match a speed of the same object that has been determined using a second camera.

The video analytics platform may use the determined features, e.g., the determined features in tables 112 and 114, to correlate the objects shown in the first video, e.g., objects V1, V2 and P1, with one or more objects shown in the second video, e.g., objects V3 and P2. For example, the video analytics platform may determine that the object V3 shown in the second video is the same as the object V2 shown in the first video, e.g., by comparing one or more corresponding entries for V2 and V3 in tables 112 and 114, respectively. In addition, the video analytics platform may determine that the object P2 shown in the second video is the same as the object P1 shown in the first video, e.g., by comparing one or more corresponding entries for P1 and P2 in tables 112 and 114, respectively. Furthermore, the video analytics platform may determine that the object V1 shown in the first video is not the same object as V3 and P2 shown in the second video, e.g., by determining that one or more entries in the table 112 for the object V1 significantly differ to the entries for the objects V3 and P2 in table 114. For example, the video analytics platform may determine that the location of object V1 significantly differs to the location of object V3. Techniques for correlating objects in overlapping camera fields of view are described in more detail below with reference to FIG. 3.

Figure 2A:
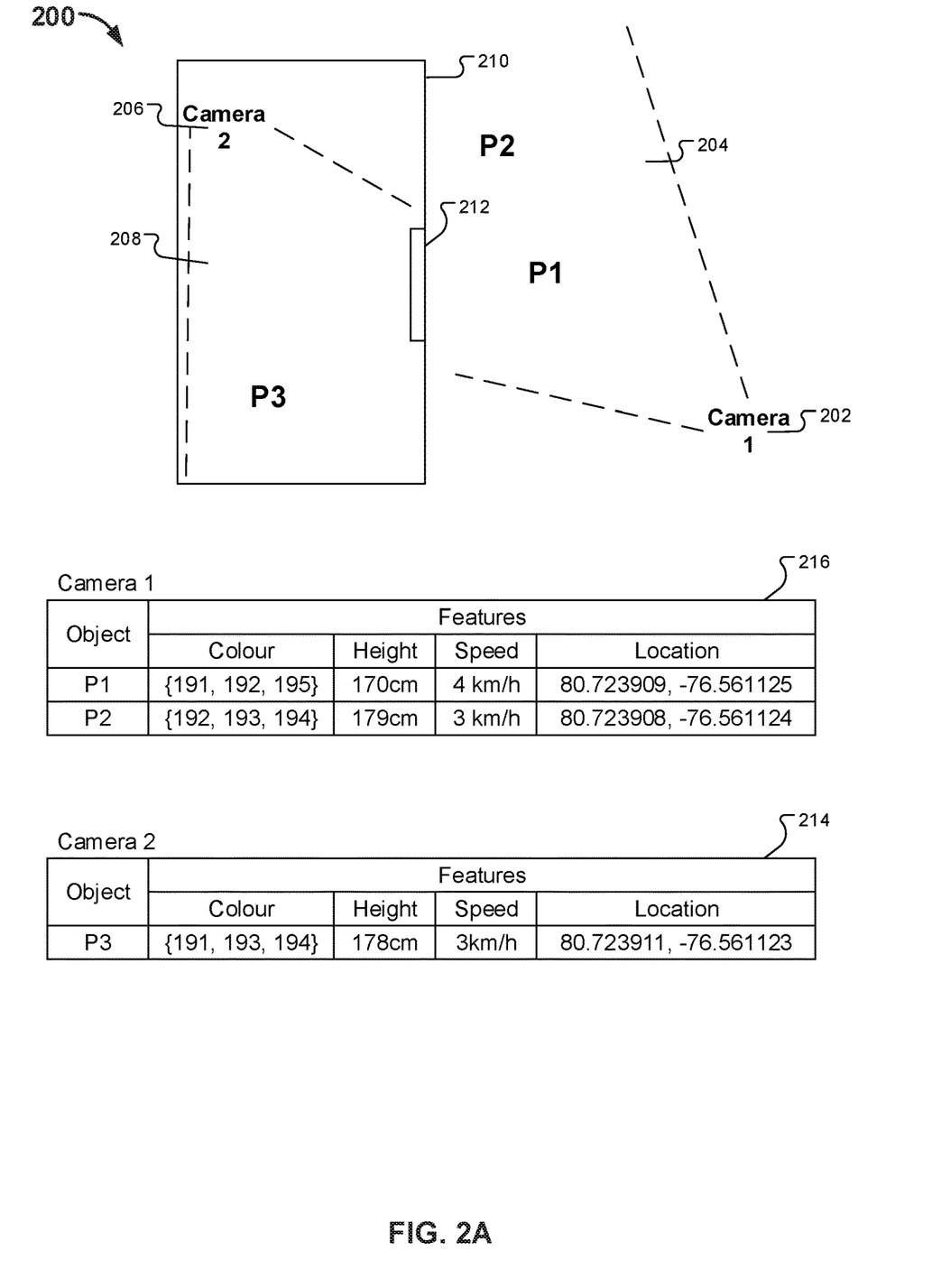
FIGS. 2A and 2B depict example overhead views of multiple non-overlapping cameras in a real-world environment. In particular.

FIG. 2A depicts an example overhead view 200 of multiple non-overlapping cameras in a real-world environment. In particular, FIG. 2A shows multiple objects in the environment at a first instance in time.

Figure 2B:
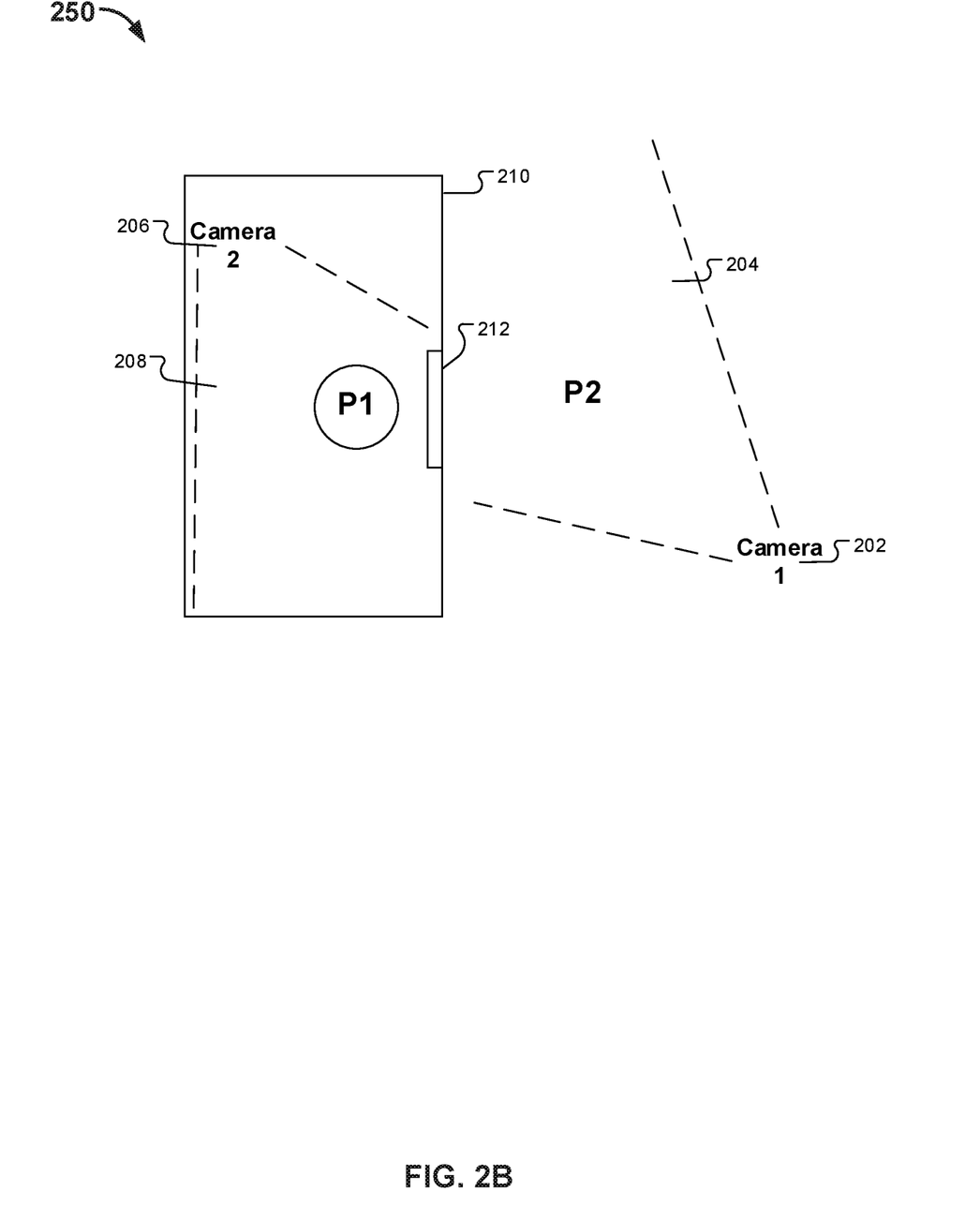

The overhead views 200 and 250 shown in FIGS. 2A and 2B both show an environment that includes a first camera 202 and a second camera 206. The first camera 202 is located outside a contained area 210, e.g., an entrance area of a convenience store, bank or hotel, and has a first field of view 204. The second camera 206 is located inside of the contained area 210 and has a second field of view 208. For example, the contained area 210 may be a bank. The bank may have installed the first camera 202 to monitor the street and entrance area outside the bank and may have installed the second camera 206 to monitor the lobby of the bank. The first field of view 204 does not overlap with the second field of view 208, e.g., due to the presence of a revolving door 212. The first camera 202 and second camera 206 are therefore non-overlapping cameras.

The first camera 202 captures a first video that shows a two-dimensional (2D) scene of the environment. The first video may show one or more objects that appear in the first field of view 204. Continuing the example above, the second field of view may include an area outside of a bank and objects that appear in the first field of view 204 may include vehicles passing the bank 210, pedestrians passing or entering the bank, street signs, lampposts, trashcans or benches. For illustrative purposes, FIG. 2A shows two objects P1 and P2, e.g., two pedestrians, as appearing in the first field of view 204.

The first camera 202 may capture a first video of the first 2D scene of the environment and provide the captured video for analysis, e.g., to a video analytics platform as described in more detail below with reference to FIG. 4. The video analytics platform may analyze the captured first video to determine features of the one or more objects that appear in the first field of view 104, e.g., object classification, object geolocation, object colour, object dimensions or object speed. In some implementations, the feature set determined for a given object may be universally applicable to any object that appears within a given video scene. For example, the video analytics platform may be programmed to always determine a size, location, and speed of a detected object in the scene, regardless of the type of object. In some implementations, the video analytics platform may further determine object-type specific features upon identifying the type of object of an object detected in a scene. The platform, for example, may include a database that stores different sets of features for different object types. For example, vehicles may be distinguished from other vehicles based on their predominant color, make, and model, and so these additional features may be specifically determined for vehicles detected in a video scene. Persons may be distinguished from other persons based on features such as clothing, facial characteristics, and the like, and so these additional features may be specifically determined for persons detected in a video scene.

For example, as shown in table 216, the video analytics platform may analyze the captured first video and determine that object P1, e.g., a first pedestrian, may predominantly be represented in RGB colours as {191, 192, 195}, has a maximum height of 170 cm, is travelling at a speed of 4 km/h and is located at (80.723909, −76.561125) in GPS coordinates. In addition, the video analytics platform may determine that object P2, e.g., a second pedestrian, may predominantly be represented in RGB colours as {192, 193, 194}, has a maximum height of 179 cm, is travelling at a speed of 3 km/h and is located at (80.723908, −76.561124) in GPS coordinates.

The second camera 206 captures a second video that shows a second 2D scene of the environment. The second video may show one or more objects that appear in the second field of view 208. For example, continuing the example above, the second field of view 208 may include the inside of the lobby of the bank and objects that appear in the second field of view may include pedestrians or items of furniture. For illustrative purposes FIG. 2A shows one object P3, e.g., a person, as appearing in the second field of view 208.

The second camera 106 may capture a second video of the second 2D scene of the environment and provide the captured video for analysis, e.g., to a video analytics platform. The video analytics platform may analyze the captured second video to determine features of the one or more objects that appear in the second field of view 208, e.g., object geolocation, object colour, object dimensions or object speed.

For example, as shown in table 214, the video analytics platform may analyze the captured first video and determine that object P3, e.g., a person, may predominantly be represented in RGB colours as {191, 193, 194}, has a maximum height of 178 cm, is travelling at a speed of 3 km/h and is located at (80.723911, −76.561123) in GPS coordinates.

The video analytics platform may use the determined features, e.g., the determined features in tables 214 and 216, to correlate the objects shown in the first video, e.g., objects P1 and P2, with one or more objects shown in the second video, e.g., object P3. For example, the video analytics platform may predict that the object P1 shown in the first video is moving into the second 2D scene shown by the second video, e.g., by determining that the object P1 is moving in a direction and with a certain speed towards the entrance to the contained area 210.

In some implementations the video analytics platform may apply one or more real-world constraints to the objects shown in the first video in order to predict whether one or more of the objects are moving into the second 2D scene. Constraints can be defined by rules that, e.g., represent real-world characteristics of at least one of objects or an environment, and that indicate whether two or more candidate objects can be the same object. For example, the video analytics platform may identify an object shown in the first video as a person based on the determined features, such as predominant colour, height and speed at which the object is moving. Based on identifying the object as a person, the video analytics platform may apply one or more real-world constraints to the person.

For example, a first constraint may include constraining a possible entry of the person into the contained area 210 as occurring through the entrance door 212 only. By applying this constraint, the video analytics platform may only predict that the person is moving into the second scene, e.g., entering the contained area 210, if they are moving in a direction towards the entrance 212 of the contained area 210 and not if they are moving in a direction towards another part of the contained area 210.

As another example, a second constraint may include constraining a type of object that may enter the contained area 210. By applying this constraint, the video analytics platform may avoid false predictions of objects moving into the second scene, e.g., falsely predicting that a vehicle will enter the contained area 210 through the entrance door 212 or otherwise.

As another example, a third constraint may include constraining a possible entry of the person into the contained area 210 as occurring in a particular direction. By applying this constraint, the video analytics platform may avoid false predictions of objects moving into the second scene, e.g., falsely predicting that a person will enter the contained area 210 through an exit-only door.

As another example, a fourth constraint may include constraining a possible speed of the person into the contained area 210 as being above a predetermined minimum speed. By applying this constraint, the video analytics platform may avoid false predictions of objects moving into the second scene, e.g., falsely predicting that a person slowly changing their direction of movement whilst speaking on the phone outside the contained area 210 will shortly enter the contained area.

FIG. 2B depicts an example overhead view 250 of the multiple non-overlapping cameras in the real-world environment described above with reference to FIG. 2A. In particular, FIG. 2B shows multiple objects in the environment at a second, later instance of time.

As shown in FIG. 2B, continuing the description above, the video analytics platform may use determined features of one or more objects shown in a first video captured by a first camera or one or more objects shown in a second video captured by a second camera, e.g., the determined features in tables 214 and 216, to track an object shown in the first video across the first field of view and the second field of view. For example, based on the determined features the video analytics platform may predict at a first instance of time that an object shown in a first video, e.g., P1, will move into a second 2D scene. Based on this prediction, the video analytics platform may identify at a second instance of time that the object shown in the first video at the first instance of time has entered the second 2D scene and is shown in the second video. The video analytics platform may use the determined features of the object to identify the object as shown in the second video. For example, the video analytics platform may use determined features such as object height and colour to identify the object in the second video. Such determined features may also enable the video analytics platform to mark a tracked object, as shown in FIG. 2B. Techniques for correlating objects in non-overlapping camera fields of view are described in more detail below with reference to FIG. 3.

Figure 3:
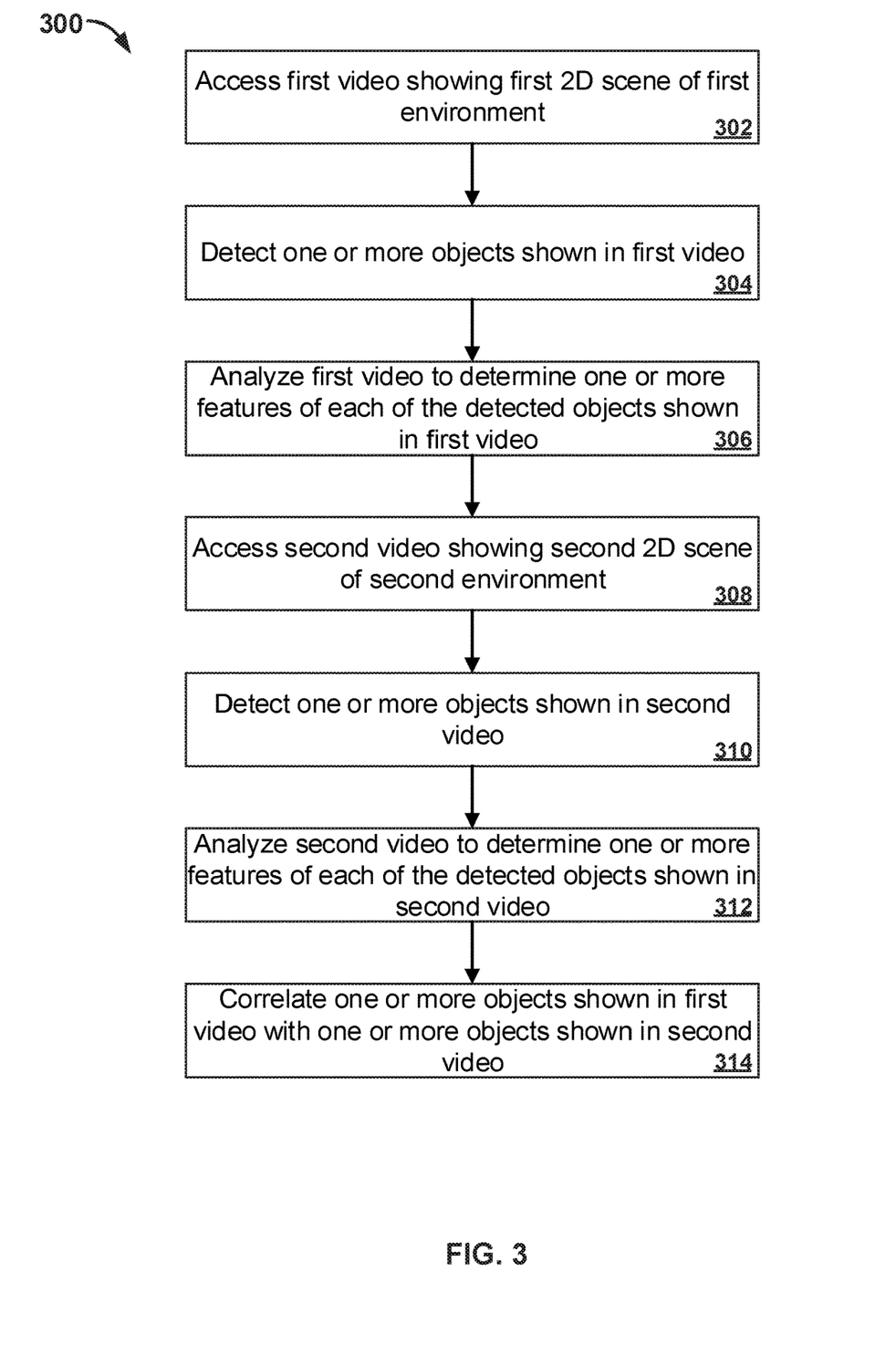
FIG. 3 is a flowchart of an example process for correlating multiple objects shown in multiple videos.

FIG. 3 is a flowchart of an example process 300 for correlating multiple objects shown in multiple videos. In some implementations, the process 300 may be carried out by the devices and systems described herein, including computing system 400 depicted in FIG. 4. Although the flowchart depicts the various stages of the process 300 occurring in a particular order, certain stages may, in some implementations, be performed in parallel or in a different order than what is depicted in the example process 300 of FIG. 3.

At stage 302, the system accesses, by a computing system, a first video that shows a first two-dimensional (2D) scene of an environment. The first video may be a video captured by a first camera located in the environment having a first field of view, e.g., a video captured by a first camera 102 having a first field of view 104 as shown in FIG. 1 above.

At stage 304, the system detects one or more objects shown in the first video. The type of objects shown in the first video depends on the location of the camera that captures the first video. For example, as described above with reference to FIGS. 1-2B, the first field of view may include a street and sidewalk and objects that appear in the first field of view may therefore include vehicles, pedestrians, trashcans, benches, street signs or lampposts.

At stage 306, the system analyzes the first video to determine one or more features of each of the one or more objects shown in the first video. Features of an object may include one or more of (i) object geolocation, (ii) object speed, (iii) object heading, (iv) object colour profile, or (v) object dimensions. For example, the system may analyze an object to determine an average height or width of the object to the nearest centimeter or an average speed of the object to the nearest kilometers per hour or meters per second. As another example, the system may analyze an object to determine a colour representation of the object in RGB that represents an average colour of the object, or a predominant colour of the object.

At stage 308, the system accesses a second video that shows a second 2D scene of the environment. The second video may be a video captured by a second camera located in the environment having a second field of view, e.g., a video captured by a second camera 106 having a second field of view as shown in FIG. 1 above.

In some implementations at least a portion of the first 2D scene may overlap with a portion of the second 2D scene, e.g., as depicted by region 110 in FIG. 1 above. In these implementations the first camera and second camera are said to be overlapping cameras. Overlapping cameras are depicted in FIG. 1 above.

In other implementations the first 2D scene and second 2D scene are disjoint 2D scenes, e.g., as depicted in FIGS. 2A and 2B above. In these implementations the first camera and second camera are said to be non-overlapping cameras. Non-overlapping cameras are depicted in FIGS. 2A and 2B above.

At stage 310, the system detects one or more objects shown in the second video. The type of objects shown in the second video depends on the location of the camera that captures the second video. For example, as described above with reference to FIGS. 2A and 2B, the second field of view may include the inside of a building and objects that appear in the second field of view may therefore include people or furniture.

At stage 312, the system analyzes the second video to determine one or more features of each of the one or more objects shown in the second video. As described above with reference to stage 306, features of an object may include one or more of (i) object geolocation, (ii) object speed, (iii) object heading, (iv) object colour profile, or (v) object dimensions.

At stage 314, the system correlates one or more objects shown in the first video with one or more objects shown in the second video. The system correlates one or more objects shown in the first video with one or more objects shown in the second video based on (i) the determined one or more features of each of the one or more objects shown in the first video, and (ii) the determined one or more features of each of the one or more objects shown in the second video.

For example, as described above with reference to stage 308, in some implementations the first camera and second camera are overlapping cameras and at least a portion of the first 2D scene may overlap with a portion of the second 2D scene. In these implementations correlating one or more objects shown in the first video with one or more objects shown in the second video may include determining that one or more objects shown in the first video are the same as one or more objects shown in the second video. The system may determine that one or more objects shown in the first video are the same as one or more objects shown in the second video by comparing the determined one or more features of each object shown in the first video with the determined one or more features of each of the one or more objects shown in the second video.

For example, in some implementations the system may represent the object shown in the first video and each of the one or more objects shown in the second video as respective feature vectors. The system may then perform a similarity comparison of the feature vector representing the object shown in the first video and each feature vector representing the one or more objects shown in the second video.

In other implementations the system may determine respective similarity scores between each determined feature of the object shown in the first video and the features of the one or more objects shown in the second video. For each object shown in the second video, the system may combine the determined similarity scores to generate an overall similarity score and for each object shown in the second video, compare the generated overall similarity score to a predetermined threshold similarity score to determine whether the object shown in the second video is the same as the object shown in the first video.

As described above, in some implementations the system may apply one or more real-world constraints to the one or more objects shown in the first video and the one or more objects shown in the second video in order to determine that one or more objects shown in the first video are the same as one or more objects shown in the second video. For example, the first video and second video may show overlapping portions of a highway. In some instances two vehicles of very similar type, e.g., dimensions, colour and speed, may travel in opposite directions on the highway. In these cases, the system may apply a real-world constraint to the vehicles shown in the first and second video that specifies that vehicles traveling on the right hand side of the highway travel in a first direction and vehicles traveling on the left hand side of the highway travel in a second direction. For example, this constraint may ensure that the system will not falsely determine that the vehicles are a same vehicle.

In other examples, as described above with reference to stage 308, in some implementations the first 2D scene and second 2D scene are disjoint 2D scenes and the first camera and second camera are said to be non-overlapping cameras. In these implementations correlating one or more objects shown in the first video with one or more objects shown in the second video may include predicting that an object shown in the first video is moving into the second 2D scene.

As described above with reference to FIG. 2A, in some implementations the system may apply one or more real-world constraints to the one or more objects shown in the first video and the one or more objects shown in the second video in order to predict that an object shown in the first video is moving into the second 2D scene. Example real-world constraints are described above with reference to FIG. 2A.

In some implementations the system may predict that an object shown in the first video is moving into the second 2D scene and track the object shown in the first video across the first field of view and the second field of view. Optionally, the system may mark the tracked object. For example, in some settings it may be beneficial to mark a tracked object as is passes across different field of view, e.g., a person or vehicle of interest. For example, an operator of a video analytics platform may use in an input device (e.g., a mouse or keyboard) to select and designate a particular object in a video to be tracked. The platform may then apply the techniques described herein to track the designated object across different fields of views of multiple video cameras, e.g., in real-time. The platform may highlight, draw a box around, or otherwise distinguish the designated tracked object during playing of video feeds from different cameras, thereby allowing viewers to more readily see the tracked object as it moves over time. In some implementations, the system may disable a respective camera when the tracked object leaves a respective field of view, e.g., to save power or other computational resources.

Optionally, the system may store data representing the correlated one or more objects shown in the first video with one or more objects shown in the second video. For example, live video feeds and data representing the correlated one or more objects shown in the first video with one or more objects shown in the second video may be used by the system to perform video analytics. For example, the system may use the data to track people, vehicles or other objects of interest. In other examples the system may use the data to foresee or prevent incidents occurring. In further examples the system may use stored data to trace an object from recorded video.

For example, the video analytics platform may record video from multiple cameras having different fields of view. After an incident has occurred, e.g., after a robbery in a department store, authorities may desire to review video footage of the suspect within the store before, during, and after commission of the alleged robbery. Using the techniques discussed herein, the video analytics platform may process the recorded video to determine features for objects detected in the videos from the various cameras. The suspect may be identified by a user, and in response, the video analytics platform may trace occurrences of the suspect in video from the department store's cameras during a time proximate to the alleged robbery by correlating the suspect's features in different videos over time.

For example, a target profile may be created to more accurately locate a suspect in live and stored video data. A target profile may include of a set of images/indexes related to a specific suspect, e.g., containing images of the suspect over several days with different clothing. The target profile may also contain objects related to the suspect, e.g., associated car/license plate information. The target profile may also contain facial images of the suspect for facial recognition purposes as well as many other attributes such as biometrics and biographic information that can be used to search within $3^{rd}$ party databases.

Figure 4:
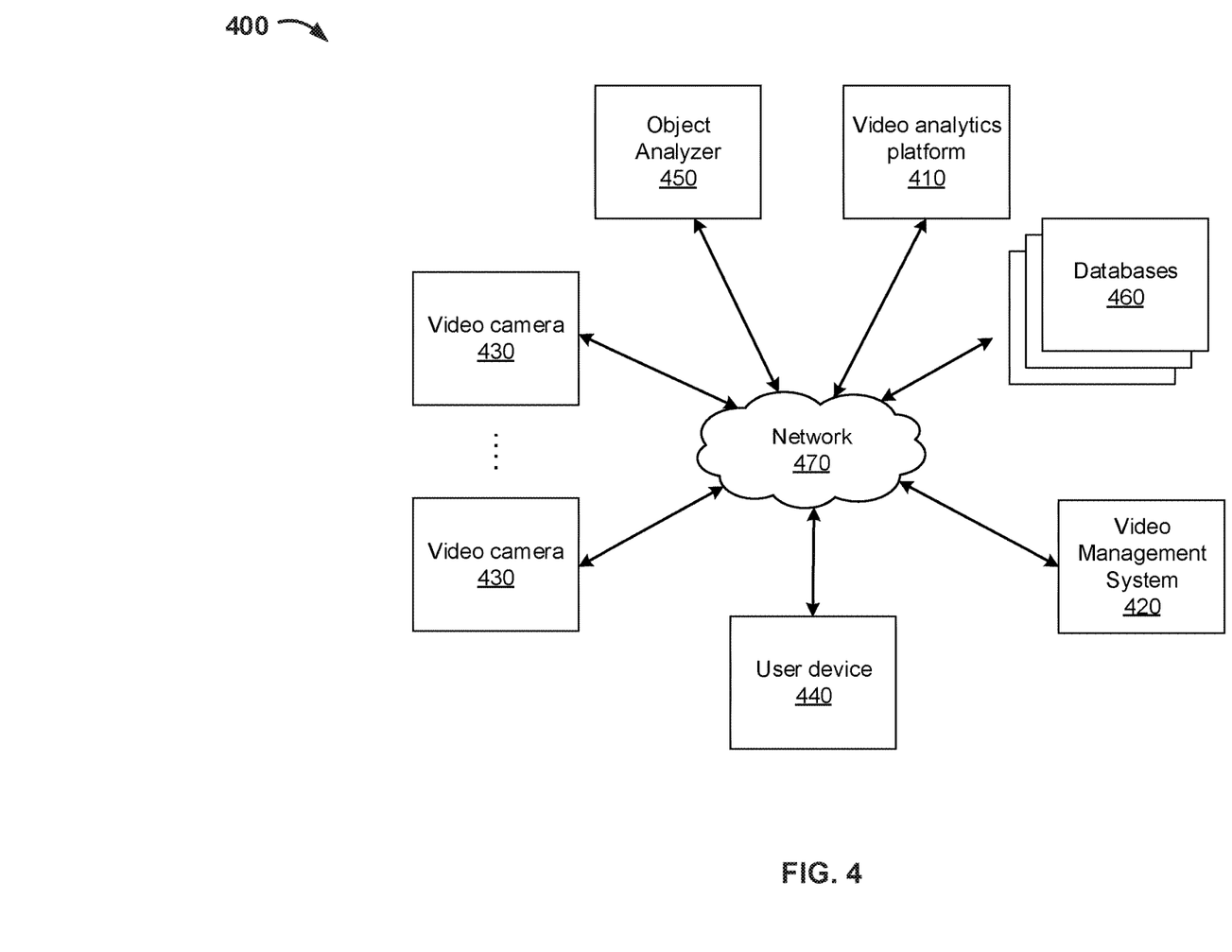
FIG. 4 depicts an example system for correlating multiple objects shown in multiple videos.

FIG. 4 depicts an example system 400 for correlating multiple objects shown in multiple videos. In some implementations, a computer network 470, such as a local area network (LAN), wide area network (WAN), the Internet, or a combination thereof, connects video analytics platform 410, video management system 420, multiple video cameras 430, user device 440, 3D model generator 450 and trip wire projector 460. In some implementations, all or some of the video analytics platform 410, video management system 420, multiple video cameras 430, user device 440, 3D model generator 450 and trip wire projector 460 can be implemented in a single computing system, and may communicate with none, one, or more other components over a network.

Video analytics platform 410 may include one or more devices capable of receiving, generating, storing, processing, and/or providing information, such as information described herein. For example, video analytics platform 410 may include one or more computing devices, such as one or more server devices, desktop computers, workstation computers, virtual machines (VMs) provided in a cloud computing environment, or similar devices. In some implementations, video analytics platform 410 may receive video information from video management systems 420 and/or video cameras 430, and may store the video information. In some implementations, video analytics platform 410 may receive video information and/or other information (e.g., fire alarms, weather alerts, or the like) from other devices and/or systems, such as, for example, social media systems, mobile devices, emergency service systems (e.g., police, fire department, weather agencies, or the like), building management systems, or the like.

In some implementations, video analytics platform 410 may apply video analytics to automatically analyze the video information and to generate real-time safety information, security information, operations information, or marketing information. The safety information may include information associated with utilization of restricted or forbidden areas, fire and/or smoke detection, overcrowding and/or maximum occupancy detection, slip and/or fall detection, vehicle speed monitoring, or the like. The security information may include information associated with perimeter monitoring, access control, loitering and/or suspicious behavior, vandalism, abandoned and/or removed objects, person of interest tracking, or the like. The operations information may include information associated with service intervention tracking, package and/or vehicle count, mobile asset locations, operations layout optimization, resource monitoring and/or optimization, or the like. The marketing information may include information associated with footfall traffic, population density analysis, commercial space layout optimization, package demographics, or the like.

In some implementations, the video analytics applied by video analytics platform 410 may include people recognition, safety alert generation, license plate recognition, augmented reality, post-event analysis, crowd counting, cross-camera tracking, incident detection, wide-spectrum imagery, object recognition, video indexing, traffic monitoring, footfall traffic determination, left object detection, suspicious behavior detection, or the like. In some implementations, video analytics platform 410 may generate a user interface that includes the real-time safety information, the security information, the operations information, or the marketing information, and may provide the user interface to user device 440. User device 440 may display the user interface to a user of user device 440.

Video management system 420 may include one or more devices capable of receiving, generating, storing, processing, and/or providing information, such as information described herein. For example, video management system 420 may include a computing device, such as a server, a desktop computer, a laptop computer, a tablet computer, a handheld computer, one or more VMs provided in a cloud-computing environment, or a similar device. In some implementations, video management system 420 may be associated with a company that receives, stores, processes, manages, and/or collects information received by video cameras 430. In some implementations, video management systems 420 may communicate with video analytics platform 410 via network 470.

Video camera 430 may include a device capable of receiving, generating, storing, processing, and/or providing video information, audio information, and/or image information. For example, video camera 430 may include a photographic camera, a video camera, a microphone, or a similar device. In some implementations, video camera 430 may include a PTZ video camera. In some implementations, video camera 430 may communicate with video analytics platform 410 via network 470.

User device 440 may include a device capable of receiving, generating, storing, processing, and/or providing information, such as information described herein. For example, user device 440 may include a computing device, such as a desktop computer, a laptop computer, a tablet computer, a handheld computer, a smart phone, a radiotelephone, or a similar device. In some implementations, user device 440 may communicate with video analytics platform 410 via network 450.

Object analyzer 450 may include one or more devices capable of detecting one or more objects shown in a video and analyzing the one or more objects to determine one or more features of each of the one or more objects. For example, object analyzer 450 may be configured to determine an object geolocation, object speed, object heading, object colour profile, object dimensions or other features of interest.

Network 470 may include one or more wired and/or wireless networks. For example, network 470 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a cloud computing network, and/or a combination of these or other types of networks.

Figure 5:
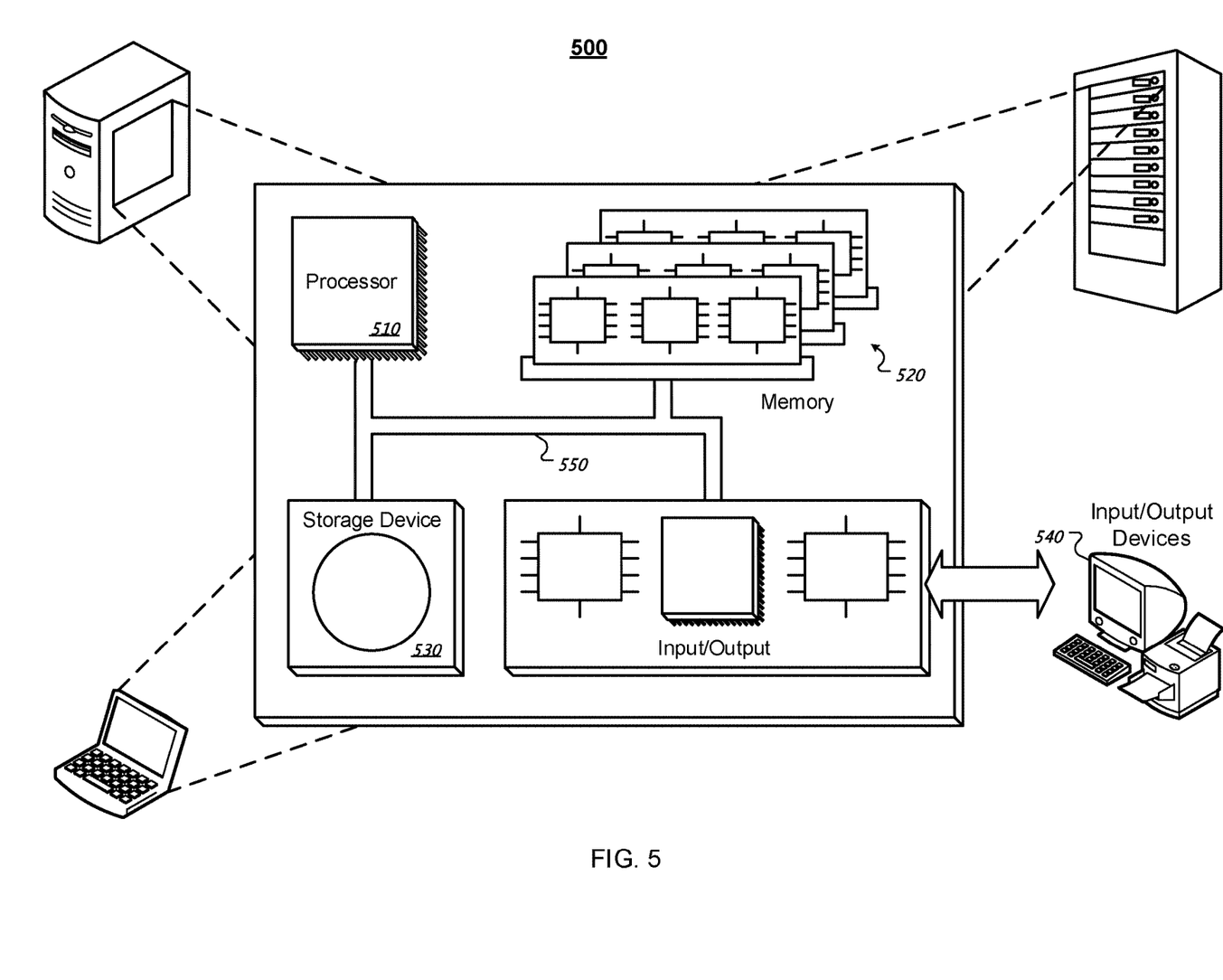
FIG. 5 depicts an example computing device that may be used to carry out the computer-implemented methods and other techniques described herein.

FIG. 5 illustrates a schematic diagram of an exemplary generic computer system 500. The system 500 can be used for the operations described in association with the process 300 according to some implementations. The system 500 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 500 includes a processor 510, a memory 520, a storage device 530, and an input/output device 540. Each of the components 510, 520, 530, and 540 are interconnected using a system bus 550. The processor 510 may be enabled for processing instructions for execution within the system 500. In one implementation, the processor 510 is a single-threaded processor. In another implementation, the processor 510 is a multi-threaded processor. The processor 510 may be enabled for processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 may be enabled for providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
   accessing, by a computing system, a first video that shows a first two-dimensional (2D) scene of an environment, the first video captured by a first camera located in the environment having a first field of view;
   detecting, by the computing system, a first object shown in the first video;
   analyzing, by the computing system, the first video to determine first values for a plurality of features of the first object shown in the first video;
   accessing, by the computing system, a second video that shows a second 2D scene of the environment, the second video captured by a second camera located in the environment having a second field of view;
   detecting, by the computing system, a second object shown in the second video;
   analyzing, by the computing system, the second video to determine second values for the plurality of features of the second object shown in the second video;
   based on (i) the features of the first object shown in the first video and (ii) the features of the second object shown in the second video, determining whether the first object and the second object are the same, including:
      determining, for each of the plurality of features, and based on the corresponding first and second values for the feature, a respective level of similarity for the feature between the first object shown in the first video and the second object shown in the second video;

determining an overall similarity between the first object and the second object based on the respective levels of similarity of the plurality of features between the first object and the second object; and
using the overall similarity between the first object and the second object to assess whether the first object and the second object are the same.

2. The method of claim 1, wherein features of an object comprise one or more of (i) object geolocation, (ii) object speed, (iii) object heading, (iv) object colour profile, (v) object dimensions.

3. The method of claim 1, wherein at least a portion of the first 2D scene overlaps with a portion of the second 2D scene.

4. The method of claim 1, wherein determining whether the first object and the second object are the same comprises:
representing (i) the first object shown in the first video, and (ii) the second object shown in the second video, as respective feature vectors; and
performing a similarity comparison of the feature vector representing the first object shown in the first video and the feature vector representing the second object shown in the second video.

5. The method of claim 1, wherein the level of similarity is represented as a similarity score, and the overall similarity is represented as an overall similarity score, and wherein using the overall similarity between the first object and the second object comprises comparing the overall similarity score to a predetermined threshold similarity score to determine whether the second object shown in the second video is the same as the first object shown in the first video.

6. The method of claim 1, wherein determining whether the first object and the second object are the same comprises applying one or more real-world constraints to the first object shown in the first video and the second object shown in the second video.

7. The method of claim 1, wherein the first 2D scene and second 2D scene are disjoint 2D scenes.

8. The method of claim 1, wherein determining whether the first object and the second object are the same comprises predicting that the first object shown in the first video is moving into the second 2D scene.

9. The method of claim 8, wherein predicting that the first object shown in the first video is moving into the second 2D scene comprises applying one or more real-world constraints to the first object shown in the first video.

10. The method of claim 1, further comprising tracking the first object shown in the first video across the first field of view and the second field of view.

11. The method of claim 10, further comprising marking the tracked object.

12. The method of claim 10, further comprising disabling a camera when the tracked object leaves a respective field of view.

13. The method of claim 1, further comprising storing data representing the first object shown in the first video assessed with the second object shown in the second video.

14. A system comprising one or more computers and one or more storage devices storing instructions that are operable, when executed by the one or more computers, to cause the one or more computers to perform operations comprising:
accessing, by a computing system, a first video that shows a first two-dimensional (2D) scene of an environment, the first video captured by a first camera located in the environment having a first field of view;
detecting, by the computing system, a first object shown in the first video;
analyzing, by the computing system, the first video to determine first values of a plurality of features of the first object shown in the first video;
accessing, by the computing system, a second video that shows a second 2D scene of the environment, the second video captured by a second camera located in the environment having a second field of view;
detecting, by the computing system, a second object shown in the second video;
analyzing, by the computing system, the second video to determine second values of the plurality of features of the second object shown in the second video;
based on (i) the features of the first object shown in the first video and (ii) the features of the second object shown in the second video, determining whether the first object and the second object are the same, including:
determining, for each of the plurality of features, and based on the corresponding first and second values for the feature, a respective level of similarity for the feature between the first object shown in the first video and the second object shown in the second video;
determining an overall similarity between the first object and the second object based on the respective levels of similarity of the plurality of features between the first object and the second object; and
using the overall similarity between the first object and the second object to assess whether the first object and the second object are the same.

15. The system of claim 14, wherein features of an object comprise one or more of (i) object geolocation, (ii) object speed, (iii) object heading, (iv) object colour profile, (v) object dimensions.

16. The system of claim 14, wherein at least a portion of the first 2D scene overlaps with a portion of the second 2D scene.

17. The system of claim 14, wherein the first 2D scene and second 2D scene are disjoint 2D scenes.

18. A computer-implemented method comprising:
accessing, by a computing system, a first video that shows a first two-dimensional (2D) scene of an environment, the first video captured by a first camera located in the environment having a first field of view;
detecting, by the computing system, a first object shown in the first video;
analyzing, by the computing system, the first video to determine one or more features of the first object shown in the first video;
accessing, by the computing system, a second video that shows a second 2D scene of the environment, the second video captured by a second camera located in the environment having a second field of view;
detecting, by the computing system, a second object shown in the second video;
analyzing, by the computing system, the second video to determine one or more features of the second object shown in the second video;
based on (i) the determined one or more features of each of the first object shown in the first video, and (ii) the determined one or more features of the second object shown in the second video, correlating, by the computing system, the first object shown in the first video with the second object shown in the second video, including:

applying one or more real-world constraints to the first object shown in the first video and the second object shown in the second video, the real-world constraints defined by rules representing real-world characteristics of the objects or environments thereof; and determining that the first object shown in the first video is the same as the second object shown in the second video.

19. The method of claim 18, wherein the real-world constraints include constraining possible entries of the objects into contained areas as occurring through predetermined entrances or in predetermined directions.

20. The method of claim 18, wherein the real-world constraints include types of the objects that can enter constrained areas.

21. The method of claim 18, wherein the real-world constraints include constraining possible speeds of the objects into contained areas as being above predetermined minimum speeds.

* * * * *